United States Patent
Bhandari et al.

(10) Patent No.: US 10,025,401 B2
(45) Date of Patent: Jul. 17, 2018

(54) ACTIVE STYLUS RING ELECTRODE

(71) Applicant: Apple Inc., Cupertino, CA (US)

(72) Inventors: Priyanka Bhandari, San Francisco, CA (US); Blake R. Marshall, San Jose, CA (US); Li-Quan Tan, Sunnyvale, CA (US); Reza Nasiri Mahalati, Belmont, CA (US); Aidan N. Zimmerman, Sunnyvale, CA (US); Ryan P. Brooks, Menlo Park, CA (US); Kevin C. Armendariz, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/848,277

(22) Filed: Sep. 8, 2015

(65) Prior Publication Data
US 2017/0068337 A1 Mar. 9, 2017

(51) Int. Cl.
*G06F 3/044* (2006.01)
*G06F 3/038* (2013.01)
(Continued)

(52) U.S. Cl.
CPC ........ *G06F 3/0383* (2013.01); *G06F 3/03545* (2013.01); *G06F 3/044* (2013.01); *H01G 5/12* (2013.01); *H01G 5/145* (2013.01)

(58) Field of Classification Search
CPC .................................................. G06F 3/03545
See application file for complete search history.

(56) References Cited

U.S. PATENT DOCUMENTS

| 5,414,227 A | 5/1995 | Schubert et al. |
| 5,483,261 A | 1/1996 | Yasutake |
| (Continued) | | |

FOREIGN PATENT DOCUMENTS

| EP | 2 466 431 A1 | 6/2012 |
| EP | 2 672 494 A1 | 12/2013 |
| (Continued) | | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Amare Mengistu
*Assistant Examiner* — Shawna Stepp Jones
(74) *Attorney, Agent, or Firm* — Morrison & Foerster LLP

(57) ABSTRACT

A ring electrode to determine the orientation of the stylus relative to the surface. The stylus can include a ring electrode configuration which can improve capacitive coupling between the ring electrode and the touch panel. The ring electrode configuration can include a ring electrode and ground ring, and ground plate. By varying the lengths of ring electrode, ground ring, ground plate, and the distance between these elements, the electric field emanating from the ring electrode can be tuned to optimize the capacitive coupling between the ring electrode and surface. In some examples, the ring electrode can include multiple sub-rings. In some examples, the ring electrode can comprise a crown shape including projections, each having a width that tapers to a minimum width along the length of the ring electrode.

25 Claims, 12 Drawing Sheets

(51) Int. Cl.
*G06F 3/0354* (2013.01)
*H01G 5/12* (2006.01)
*H01G 5/14* (2006.01)

(56) References Cited

U.S. PATENT DOCUMENTS

| | | | |
|---|---|---|---|
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 8,773,405 B1 | 7/2014 | Ryshtun et al. | |
| 2006/0197753 A1 | 9/2006 | Hotelling | |
| 2012/0331546 A1 | 12/2012 | Falkenburg et al. | |
| 2013/0106718 A1* | 5/2013 | Sundara-Rajan | G06F 3/038 345/173 |
| 2015/0138164 A1* | 5/2015 | Hinson | G06F 3/0383 345/179 |
| 2015/0277618 A1* | 10/2015 | Bulea | G06F 3/0418 345/174 |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report dated Feb. 7, 2017, for PCT Application No. PCT/US2016/048590, filed Aug. 25, 2016, eight pages.

* cited by examiner

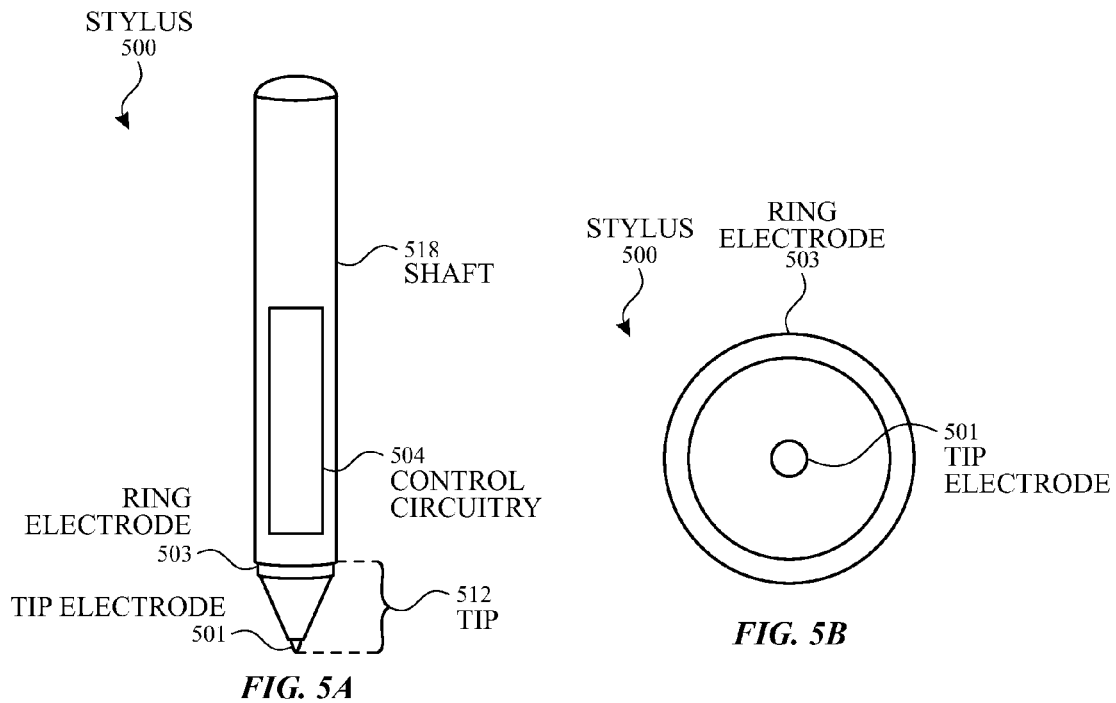
*FIG. 5A*
*FIG. 5B*
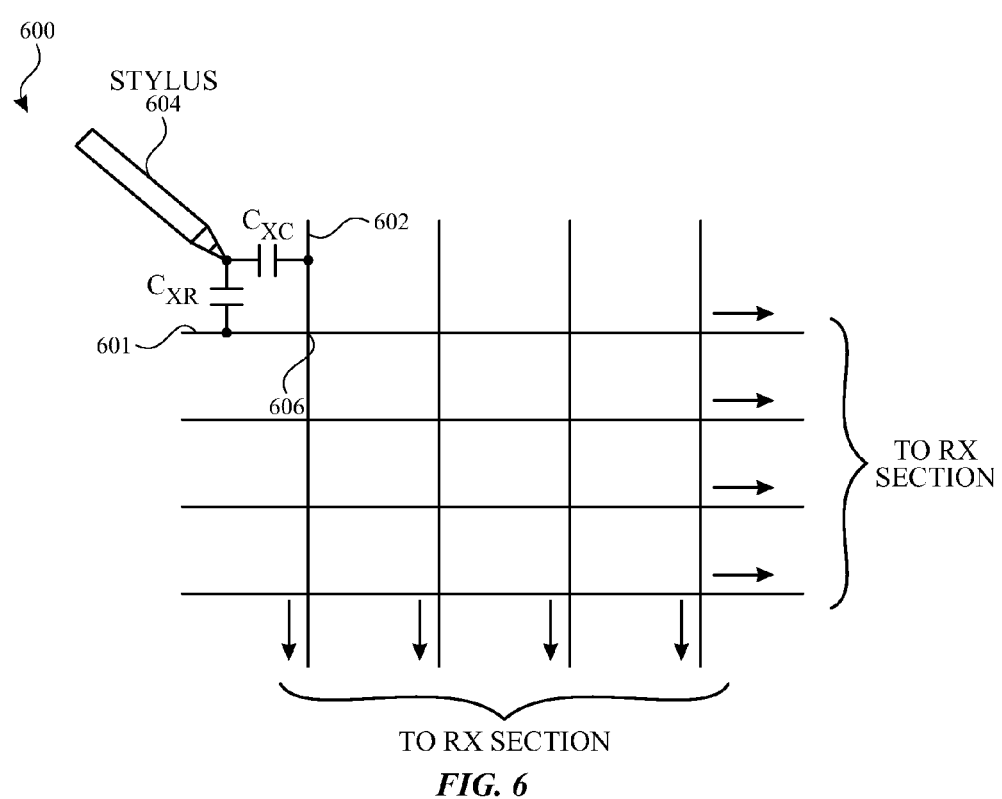
*FIG. 6*

ACTIVE STYLUS RING ELECTRODE

FIELD

This relates generally to input devices for use with touch-sensitive devices and, more specifically, to the design of a ring electrode of an active stylus.

BACKGROUND

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, the touch-sensitive device can recognize a touch or hover event and the position of the event on the touch panel, and the computing system can then interpret the event in accordance with the display appearing at the time of the event, and thereafter can perform one or more actions based on the event.

Styli have become popular input devices for touch-sensitive devices. In particular, use of an active stylus capable of generating stylus stimulation signals that can be sensed by the touch-sensitive device can improve the precision and control of the stylus. A stylus can have various orientations (e.g., azimuth angle and tilt angle) as it touches or hovers over a touch panel. Some styli can detect the orientation of the stylus and perform actions based on the stylus orientation. However, detecting the azimuth angle and tilt angle of an active stylus can be difficult (e.g., tilt inaccuracy and tilt jitter can result) when the active stylus is used at certain orientation angles.

SUMMARY

This relates to detection of an orientation, e.g., the azimuth angle and tilt angle, of a stylus relative to a surface. In an example, the orientation of a stylus relative to a contacting surface, e.g., a touch panel, can be detected by detecting a capacitance at one or more locations on the stylus relative to the surface, and then using the capacitance(s) to determine the orientation of the stylus relative to the surface. In some examples, the stylus can include a ring electrode configuration which can improve capacitive coupling between the ring electrode (used for orientation detection) and the touch panel. In some examples, the ring electrode configuration can include a cylindrical ring electrode connected to control circuitry and a ground ring connected to a reference potential, for example, ground. By varying the lengths of ring electrode, ground ring, and the distance between these elements, the electric field emanating from the ring electrode can be tuned to optimize the capacitive coupling between the ring electrode and surface. For example, the coupling between the cylindrical ring electrode and surface can be more uniform along the ring electrode, which can improve tilt accuracy and decrease tilt jitter, resulting in better stylus performance. In some examples, the ring electrode can include multiple sub-rings, with the respective length of each sub-ring increasing with each sub-ring along the length of the electrode away from the stylus tip. In some examples, the ring electrode can comprise a crown shape including projections, each having a width that tapers to a minimum width along the length of the ring electrode. In some cases, the surface area of the ring electrode at a portion (e.g., half of the ring electrode) proximate to the stylus tip can be less than the surface area of the ring electrode at a portion distal to the stylus tip. In some cases, the ring electrode base can include vias and can route writing from the tip electrode, ring electrode, and ground ring through the ring electrode base to control circuitry in the stylus.

BRIEF DESCRIPTION OF THE DRAWINGS

FIGS. 5A and 5B illustrate a side view and a bottom view, respectively, of an exemplary stylus according to various examples of the disclosure.

FIG. 6 illustrates an example touch sensor panel configuration operable with the touch ASIC of FIG. 2 to perform a stylus scan according to examples of the disclosure.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to detection of an orientation, e.g., the azimuth angle and tilt angle, of a stylus relative to a surface. In an example, the orientation of a stylus relative to a contacting surface, e.g., a touch panel, can be detected by detecting a capacitance at one or more locations on the stylus relative to the surface, and then using the capacitance(s) to determine the orientation of the stylus relative to the surface. In some examples, the stylus can include a ring electrode configuration which can improve capacitive coupling between the ring electrode (used for orientation detection) and the touch panel. In some examples, the ring electrode configuration can include a cylindrical ring electrode connected to control circuitry and a ground ring connected to a reference potential, for example, ground. By varying the lengths of ring electrode, ground ring, and the distance between these elements, the electric field emanating from the ring electrode can be tuned to optimize the capacitive coupling between the ring electrode and surface. For example, the coupling between the cylindrical ring electrode and surface can be more uniform along the ring electrode, which can improve tilt accuracy and decrease tilt jitter, resulting in better stylus performance. In some examples, the ring electrode can include multiple sub-rings, with the respective length of each sub-ring increasing with each sub-ring along the length of the electrode away from the stylus tip. In some examples, the ring electrode can comprise a crown shape including projections, each having a width that tapers to a minimum width along the length of the ring electrode. In some cases, the surface area of the ring electrode at a portion (e.g., half of the ring electrode) proximate to the stylus tip can be less than the surface area of the ring electrode at a portion distal to the stylus tip. In some cases, the ring electrode base can include vias and can route writing from the tip electrode, ring electrode, and ground ring through the ring electrode base to control circuitry in the stylus.

Figure 1A:
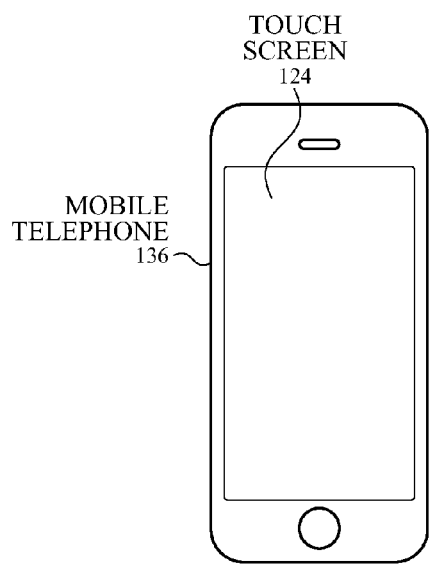
FIGS. 1A-1D illustrate examples of systems with touch screens that can accept input from an active stylus according to examples of the disclosure.
Figure 1B:
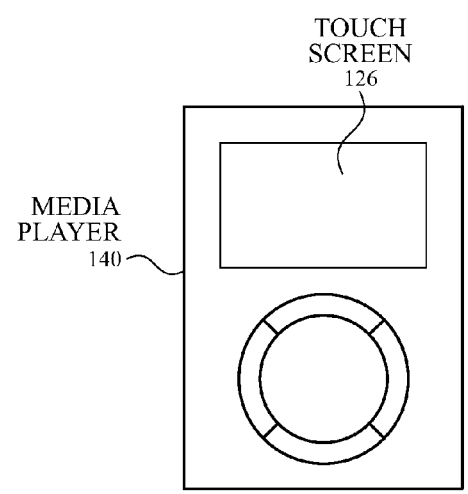
Figure 1C:
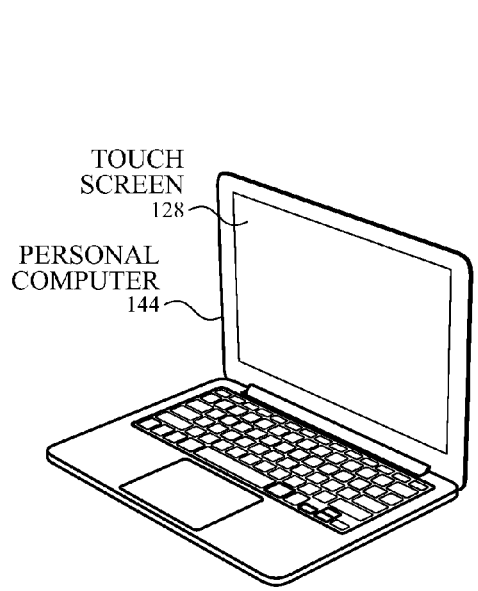
Figure 1D:
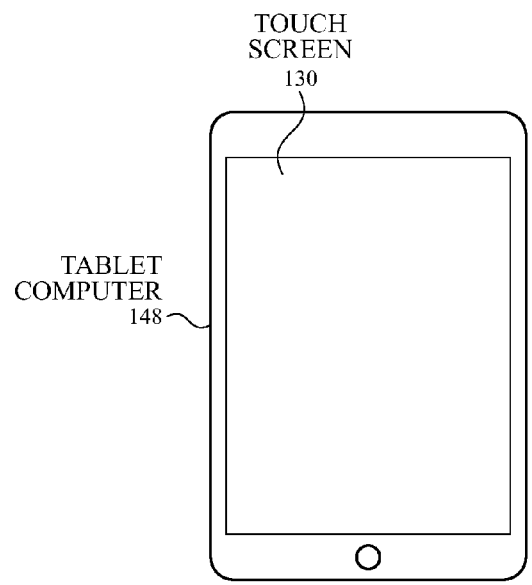

FIGS. 1A-1D illustrate examples of systems with touch screens that can accept input from an active stylus according to examples of the disclosure. FIG. 1A illustrates an exemplary mobile telephone 136 that includes a touch screen 124 that can accept input from an active stylus according to examples of the disclosure. FIG. 1B illustrates an example digital media player 140 that includes a touch screen 126 that can accept input from an active stylus according to examples of the disclosure. FIG. 1C illustrates an example personal computer 144 that includes a touch screen 128 that can accept input from an active stylus according to examples of the disclosure. FIG. 1D illustrates an example tablet computing device 148 that includes a touch screen 130 that can accept input from an active stylus according to examples of the disclosure. Other devices, including wearable devices, can accept input from an active stylus according to examples of the disclosure.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
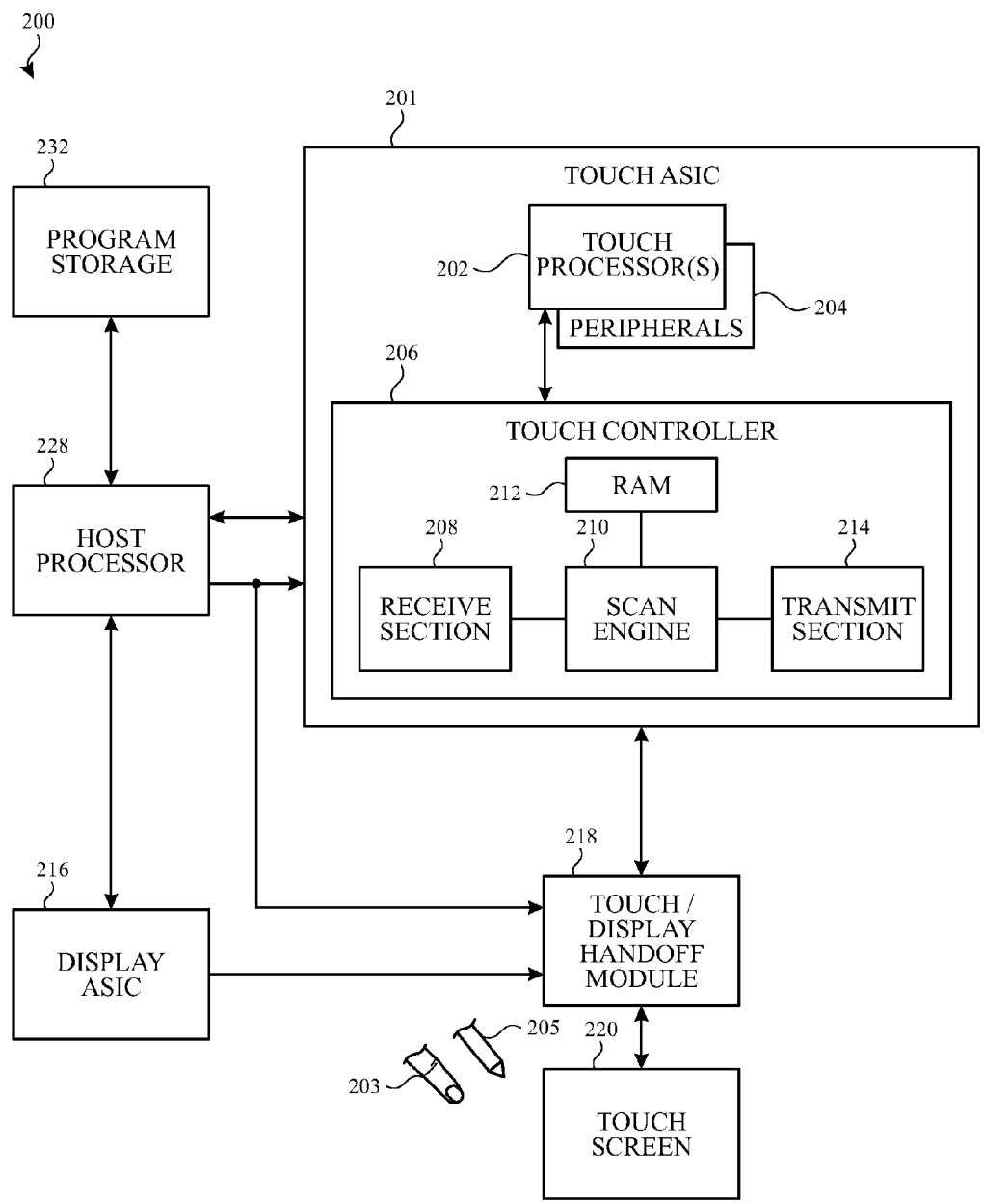
FIG. 2 illustrates a block diagram of an example computing system that can receive input from an active stylus according to examples of the disclosure.

FIG. 2 illustrates a block diagram of an example computing system 200 that can receive input from an active stylus according to examples of the disclosure. Computing system 200 could be included in, for example, mobile telephone 136, digital media player 140, personal computer 144, tablet computing device 148, wearable device, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive section 208, panel scan engine 210 (which can include channel scan logic) and transmit section 214 (which can include analog or digital driver logic). In some examples, the transmit section 214 and receive section 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit section and receive section for the specific scan event to be performed. Results (e.g., touch signals or touch data) from the various scans can also be stored in RAM 212. In addition, panel scan engine 210 can provide control for transmit section 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff module 218.

Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies the stylus can use to generate a stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
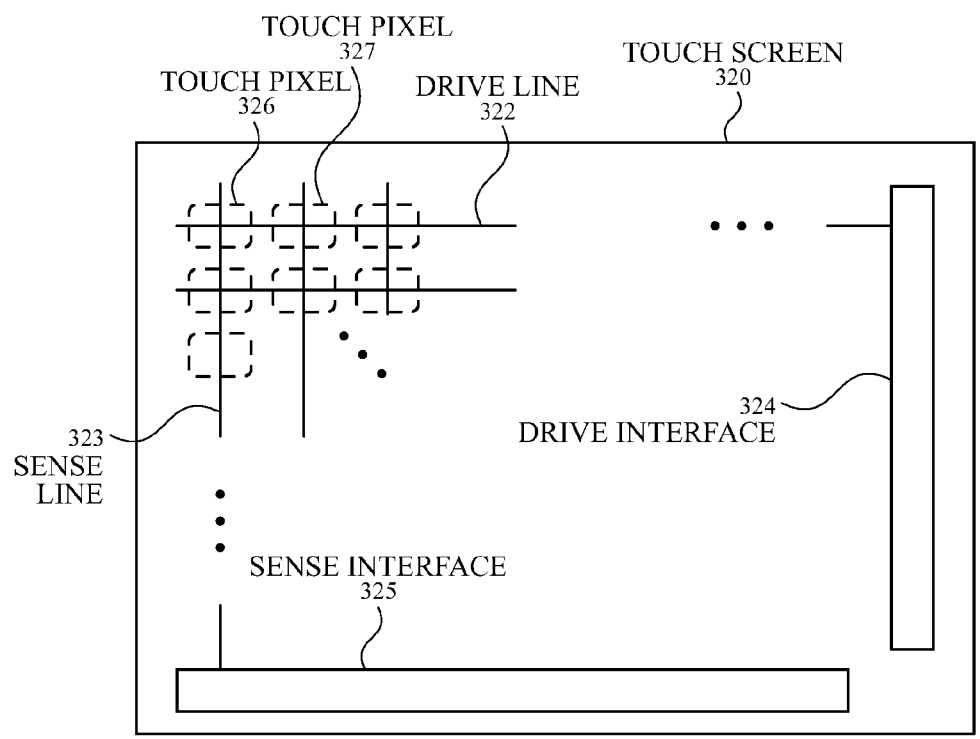
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit section 214 through a drive interface 324, and resulting sense signals generated in sense lines 323 can be transmitted through a sense interface 325 to sense channels in receive section 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans.

Figure 4:
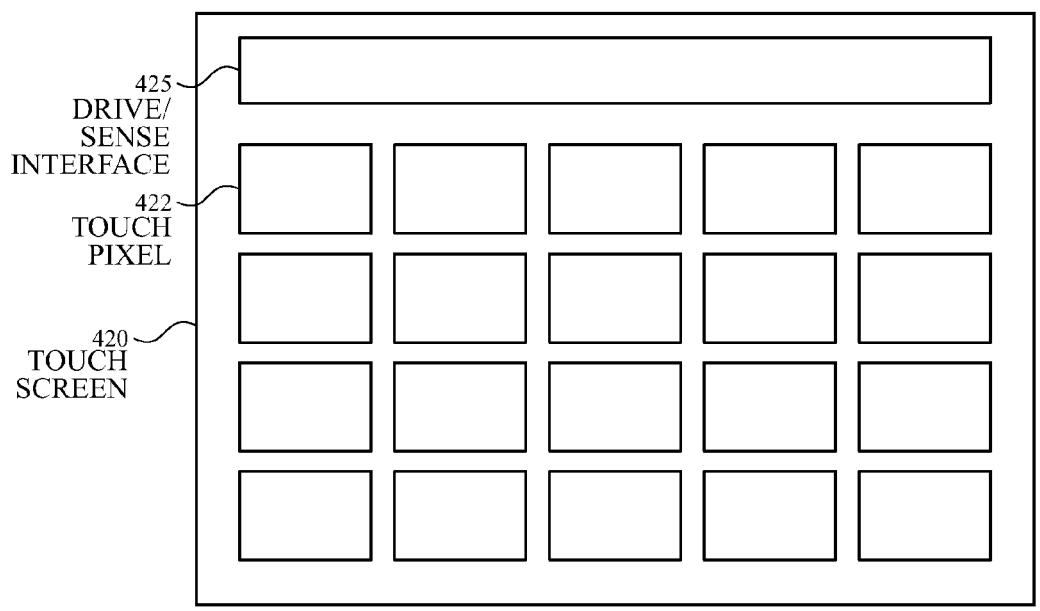
FIG. 4 illustrates an example touch screen including touch sensing circuitry configured as pixelated electrodes according to examples of the disclosure.

Additionally or alternatively, the touch screen can include touch/hover sensing circuitry including an array of pixelated electrodes. FIG. 4 illustrates an example touch screen including touch sensing circuitry configured as pixelated electrodes according to examples of the disclosure. Touch screen 420 can include touch sensing circuitry that can include a capacitive sensing medium having a plurality of electrically isolated touch pixel electrodes 422 (e.g., a pixelated touch screen). For example, in a self-capacitance configuration, touch pixel electrodes 422 can be coupled to sense channels in receive section 208 in touch controller 206, can be driven by stimulation signals from the sense channels (or transmit section 214) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controller 206 has determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen). The pixelated touch screen can be used to sense mutual capacitance and/or self-capacitance.

As discussed herein, in addition to performing touch scans to detect an object such as a finger or a passive stylus, computing system 200 can also perform stylus scans to detect an active stylus and communicate with a stylus. For example, an active stylus can be used as an input device on the surface of a touch screen of touch-sensitive device. FIG. 5A illustrates a side view of an exemplary stylus according to various examples. In the example of FIG. 5A, stylus 500 can include shaft 518 and tip 512. The tip 512 can include electrode 501 at the distal end of the tip for contacting a surface and ring electrode 503 proximate to the distal end and forming a ring around the tip. The electrodes 501, 503 can be any suitable conductive material, such as metal, paint, ink, and the like. In some examples, the tip can be replaceable. The shaft 518 can similarly be any suitable conductive material or any suitable insulating material, depending on the requirements of the stylus 500. The shaft 518 can house stylus control circuitry 504, e.g., signal transmitting and receiving elements, signal processing elements, and the like, depending on the requirements of the stylus 500.

Stylus 500 can also include control circuitry 504. Control circuitry 504 can be configured to generate one or more stylus stimulation signals at the one or more electrodes 501, 503 to stimulate a touch-sensitive device. For example, stylus stimulation signals can be coupled from stylus 500 to the touch sensing circuitry of touch screen 220, and the received signals can be processed by the touch ASIC 201. The received signals can be used to determine a location of active stylus 500 at the surface of touch screen 220. In some examples control circuitry 504 can include one or more processors. In some examples, one or more of the stylus functions described herein can be performed by firmware stored in memory or in program storage (not shown) and executed a processor in control circuitry 504.

FIG. 5B illustrates a bottom view of the exemplary stylus of FIG. 5A according to various examples. In the example of FIG. 5B, stylus 500 can have a conical shaped tip 512 with electrode 501 at the distal end of the tip and ring electrode 503 proximate to the distal end and forming a ring around the tip.

FIG. 6 illustrates an example touch sensor panel configuration operable with the touch ASIC of FIG. 2 to perform a stylus scan according to examples of the disclosure. During a stylus scan, one or more stimulation signals can be injected by stylus 604 proximate to one or more touch nodes 606. The stimulation signals injected by stylus 604 can create capacitive coupling Cxr between the stylus 604 and one or more row traces 601 and capacitive coupling Cxc between the stylus 604 and one or more column traces 602 corresponding to the one or more proximate touch nodes 606. The capacitive coupling Cxr and Cxc between the stylus 604 and the one or more touch nodes 606 can vary based on the proximity of stylus 604 to the one or more touch nodes 606. During the stylus scan, the transmit section 214 can be disabled, i.e., no stimulation signals Vstim from the touch controller are sent to touch sensor panel 600. The capacitive coupling (e.g., mutual capacitance) can be received by the receive section 208 from the row and column traces of the one or more touch nodes 606 for processing. As described herein, in some examples the one or more stylus stimulation signals can have one or more frequencies. The one or more frequencies can be selected by the touch ASIC 201 using information from a stylus spectral analysis scan (described below in more detail). This frequency information can be wirelessly communicated to the stylus 604 so that the stylus 604 can generate stimulation signals at the appropriate frequencies.

In some examples, one or more multiplexers can be used to couple row and/or column electrodes to the receive section and/or transmit section. For example, during a mutual capacitance touch sensing scan, row traces can be coupled to the transmit section and column traces can be coupled to the receive section. During a stylus sensing scan, column traces (or row traces) can be coupled via the one or more multiplexers to the receive section to detect input from a stylus or other input device along one axis of the touch screen, and then the row traces (or column traces) can be coupled via the one or more multiplexers to the receive section to detect input from a stylus or other input device along a second axis of the touch screen. In some examples, the row and column traces can be sensed simultaneously. In some examples, the stylus can be detected on the column traces concurrently with the mutual capacitance scan touch sensing scan. The touch and stylus signals can be differentiated by filtering and demodulating the received response signals at different frequencies.

A stylus can have various orientations (e.g., azimuth angle and tilt angle) as it touches or hovers over a touch panel. In some examples, an electronic device can perform an action based on stylus orientation. Accordingly, detecting the stylus orientation can be helpful in device operation.

Figure 7A:
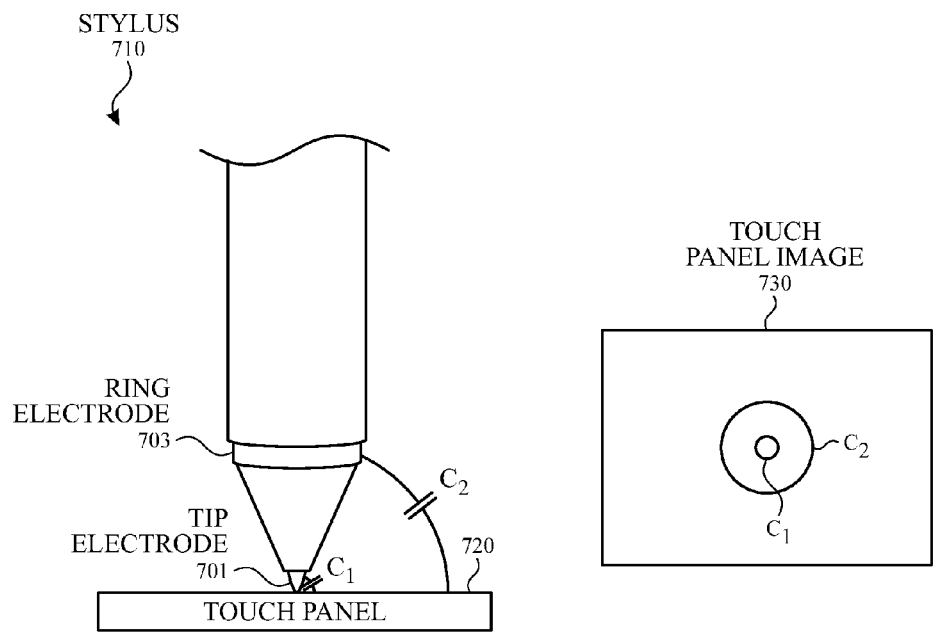
FIGS. 7A and 7B illustrate a perpendicular orientation and a tilted orientation respectively of an exemplary stylus according to various examples of the disclosure.
Figure 7B:
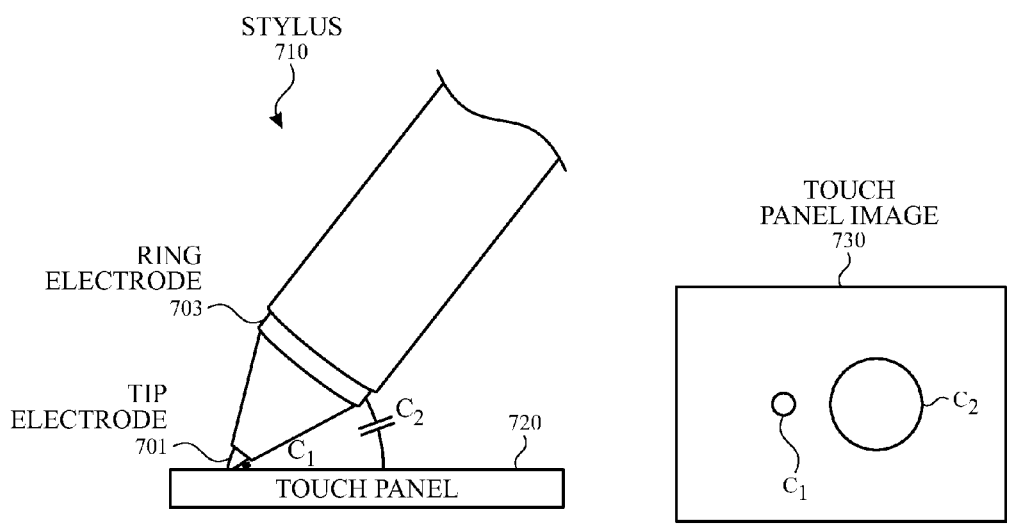

FIGS. 7A and 7B illustrate various orientations of the exemplary stylus of FIGS. 5A and 5B as it touches a touch panel according to various examples. In the example of FIG. 7A, stylus 700 can have a perpendicular orientation as it touches touch panel 720. As the stylus 700 touches the panel 720, tip electrode 701 can form capacitance C1 with a proximate conductive element, e.g., row(s) and/or column(s), (not shown) of the panel. Similarly, ring electrode 703 can form capacitance C2 with a proximate conductive element, e.g., row(s) and/or column(s), of the panel 720. Image 730 captured at the panel 720 shows example touch or hover images resulting from the two capacitances C1, C2. Because the stylus 700 is perpendicular to the panel 720, the image 730 can show the tip capacitance C1 image surrounded by the ring capacitance C2 image.

In the example of FIG. 7B, the stylus 700 can have a tilted orientation as it touches the panel 720. As a result, the image 730 captured at the panel 720 can show a shift in the positions of the touch or hover images resulting from two capacitances C1, C2 relative to each other. Here, the ring capacitance C2 image has shifted to the right of the tip capacitance C1 image. The amount of the shift can be a function of the amount of stylus tilt. For example, the greater the tilt, the further the ring capacitance C2 image is from the tip capacitance C1 image. Conversely, the lesser the tilt, the more the ring capacitance C2 image overlaps and becomes centered over the tip capacitance C1 image. Therefore, by determining the proximity of the two capacitances C1, C2 images in the captured image, the amount of stylus tilt can be determined.

The image can also be used to determine the direction of the stylus tilt, e.g., upward, downward, right, left, and so on, relative to the touch panel 720. For example, in the image 730 of FIG. 7B, the ring capacitance C2 image is to the right of the tip capacitance C1 image. This can indicate that the stylus 700 is tilted to the right. If the ring capacitance C2 image is at the left of the tip capacitance C1 image, this can indicate that the stylus 700 is tilted to the left. If the ring capacitance C2 image is above the tip capacitance C1 image, this can indicate that the stylus 700 is tilted upward. If the ring capacitance C2 image is below the tip capacitance C1 image, this can indicate that the stylus 700 is tilted downward. Other tilt directions, e.g., upper left, lower right, etc., can also be determined according to the relative positions of the capacitance C1, C2 images.

By determining the proximity of the two capacitances C1, C2 to each other and their relative positions in an image, the stylus orientation can be detected. It should be understood that although the capacitance C1 image and capacitance C2 image are illustrated here as circular, the capacitance image can be of other shapes, including linear shapes.

Figure 8A:
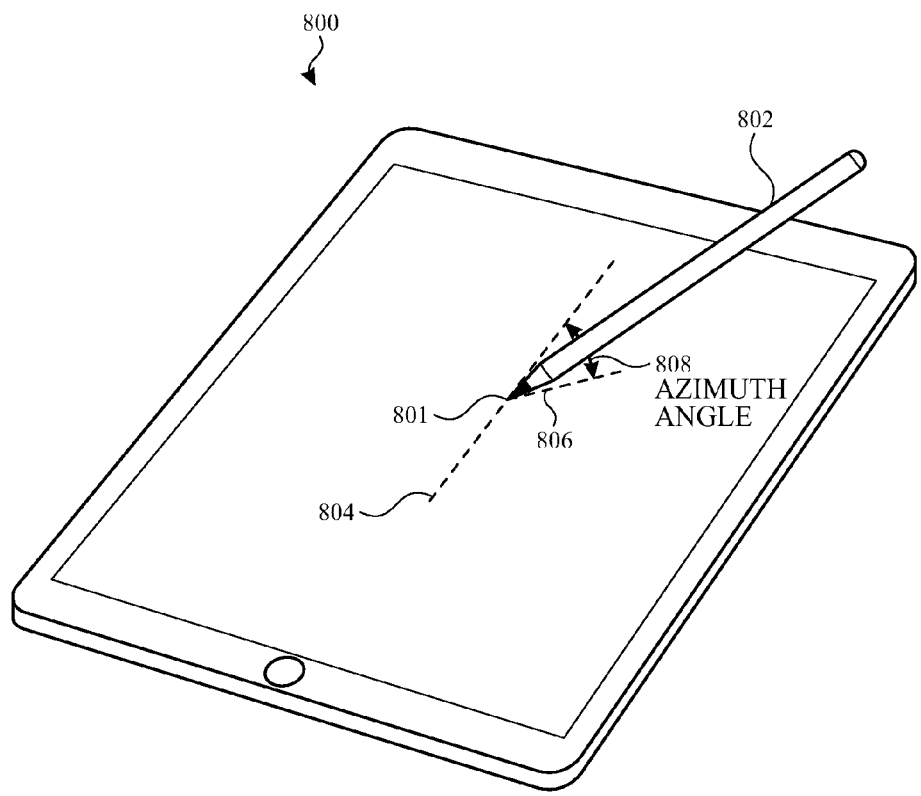
FIGS. 8A and 8B illustrate an azimuth angle and a tilt angle, respectively, for an example stylus and example touch-sensitive device according to examples of the disclosure.
Figure 8B:
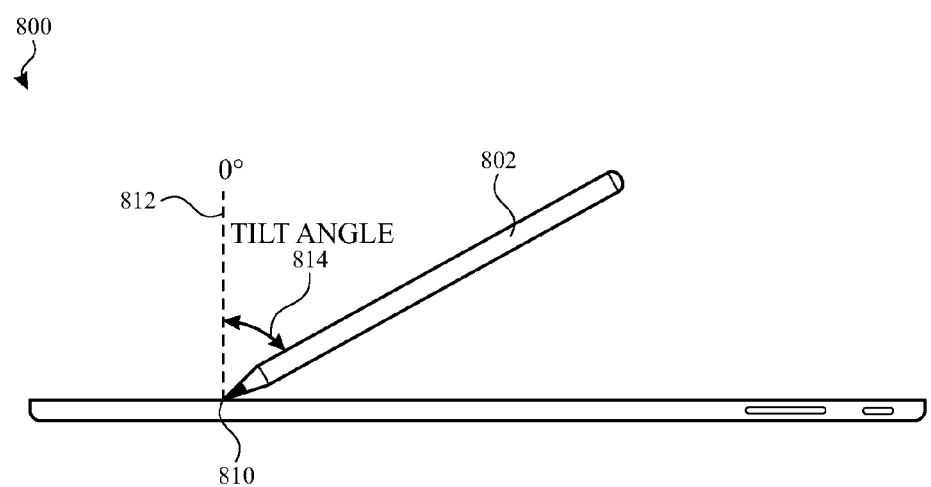

FIGS. 8A and 8B illustrate an azimuth angle and a tilt angle, respectively, for an example stylus and example touch-sensitive device according to examples of the disclosure. FIG. 8A illustrates an example stylus 802 contacting an example touch sensor panel 800 at point 801. Line 804 illustrated in FIG. 8A can represent a reference vector in the plane of touch sensor panel 800 and passing through point 801. Line 806 can represent a projection vector projecting the stylus onto the plane of the touch sensor panel 800. The angle 808 formed between the projection vector (line 806) and reference vector (line 804) can be referred to as the azimuth angle. FIG. 8B illustrates the example stylus 802 contacting the example touch sensor panel 800 at point 810. Line 812 illustrated in FIG. 8B can represent a perpendicular reference vector perpendicular to the plane of touch sensor panel 800 and passing through point 810. The angle 814 formed between the reference vector (line 812) and stylus 802 can be referred to as the tilt angle.

Tilt accuracy and tilt jitter can be useful metrics to evaluate the performance of a tilt sensor in a stylus. Tilt accuracy represents the difference between the detected tilt angle and the actual tilt angle of the stylus. Tilt jitter represents the stability of the detected tilt angle. For example, when a stylus is held at a certain tilt angle, the detected tilt angle should be stationary. However, in the presence of noise, the detected tilt angle may vary (jitter) over time, even though the stylus is stationary. Because styli can be used at varying angles (e.g., typically between 20° and 70°), orientation or tilt-dependent performance can limit the effectiveness of the stylus as an input device. In some cases, the tilt accuracy and tilt jitter of a stylus can depend, at least in part, on the geometry of the tilt sensor and its corresponding electric field (e.g., the electric field of the ring electrode). Accordingly, it can be beneficial to utilize a tilt sensor with geometry that improves the tilt accuracy and tilt jitter performance of a stylus.

Figure 9A:
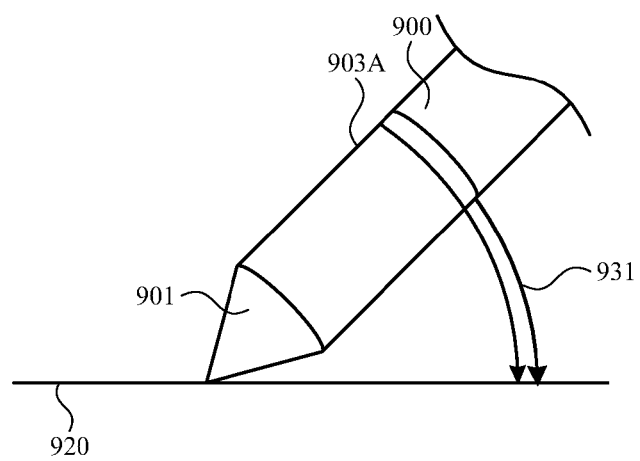
FIG. 9A illustrates an example stylus including a customary ring electrode according to examples of the disclosure.

FIG. 9A illustrates a stylus 900 including a tip electrode 901 and a customary ring electrode 903a, where the stylus is in contact with a surface 920 of a touch sensitive device. As shown, the customary ring electrode 903a can be positioned distal to the tip electrode and can have a relatively short length. For example, the length of ring electrode 903a can be less than the cross-sectional diameter of the ring electrode. The electric field 931 coupling (e.g., capacitive coupling) of ring electrode 903a is also symbolically illustrated as arrows extending from the ring electrode, where dense clustering of arrows represents a stronger electric field coupling. As shown, the coupling of electric field 931 to the surface 920 can be limited to a small region below the ring electrode. In some cases (e.g., when stylus 900 is held at a high angle), the coupling between the customary ring electrode 903a and surface 920 can be weak due to the distance between the electrode and surface, which can result in decreased tilt angle accuracy and increased tilt jitter for the stylus.

Figure 9B:
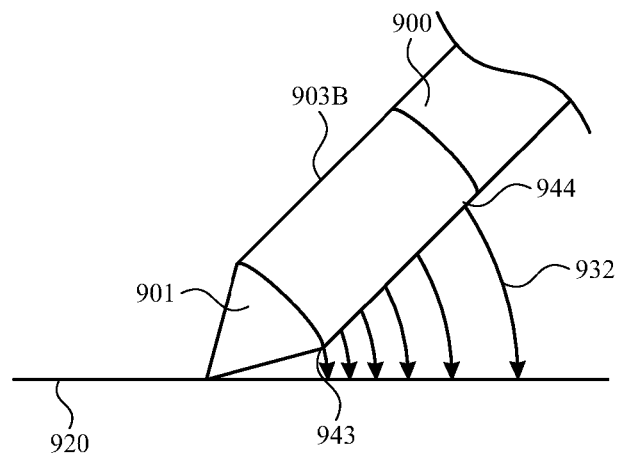
FIG. 9B illustrates an example stylus including a cylindrical ring electrode according to examples of the disclosure.

FIG. 9B illustrates a stylus including a tip electrode 901 and a cylindrical ring electrode 903b, where the stylus is in contact with a surface 920 of a touch sensitive device. Unlike the customary ring electrode 903a shown in FIG. 9A, the ring electrode 903b can have a longer length; for example, the length of the ring electrode can be 3 mm-7 mm, which can be greater than the cross-sectional diameter of the ring electrode. The electric field coupling 932 of ring electrode 903b is symbolically illustrated as arrows extending from the ring electrode, where dense clustering of arrows represents a stronger electric field coupling (e.g., capacitive coupling). As shown, coupling generally occurs between points along an electrode (e.g., between points 943 and 944 shown) and points along a corresponding line projecting the electrode onto the surface 920 (e.g., the plane of the touch sensor panel as shown in FIG. 8B). Because of the longer length of the cylindrical ring electrode, more electric field can couple (i.e., capacitively couple) between the cylindrical ring electrode and surface 920. However, as shown in FIG. 9B, in some cases (e.g., when stylus is held at an angle), the electric field coupling 932 can be uneven, that is, the coupling can be much stronger where the ring electrode 903b is nearest the surface 920 (e.g., coupling originating at point 943), and can decrease sharply as the distance between the electrode and surface increases (e.g., coupling originating at point 944). In other words, the coupling can decrease sharply along the length of the electrode in a direction away from the stylus tip. In some cases, this can result in less tilt angle accuracy and increased tilt jitter.

Figure 9C:
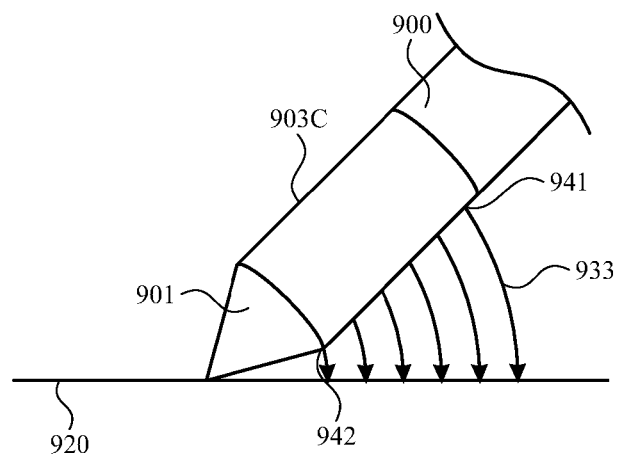
FIG. 9C illustrates an example stylus including a cylindrical ring electrode configured to have a more uniform electric field coupling according to examples of the disclosure.

As illustrated in the examples set forth above, it can be beneficial for a stylus to utilize a ring electrode wherein the electric field coupling (i.e., capacitive coupling) with a touch sensitive surface is more uniform along the length of the ring electrode when the stylus is held at an angle. FIG. 9C illustrates an example ring electrode 903c configured to have a more uniform electric field coupling when a stylus is held at an angle. Specific examples of ring electrodes will be discussed in more detail below with reference to FIGS. 10-13. The electric field coupling 933 of ring electrode 903c is symbolically illustrated as arrows extending from the ring electrode, where dense clustering of arrows represent a stronger electric field coupling. As in the example shown in FIG. 9B, coupling generally occurs between points along the electrode and points along a corresponding line projecting the electrode onto the surface 920. However, unlike the example of FIG. 9B, the coupling can be more uniform along the length of the electrode 903c as the stylus 900 is held at an angle. In some examples, this more uniform coupling can coincide with an electric field of the electrode which is stronger at points distal to the stylus tip (e.g., point 941) than at points nearer to the stylus tip (e.g., point 942). In other words, ring electrode 903c can produce an electric field which increases in strength along the length of the electrode such that the electric field coupling (i.e., capacitive coupling) with surface 920 is more uniform when a stylus is held at an angle. Accordingly, as shown in the example of FIG. 9C, when stylus 900 is held at an angle, the electric field coupling originating from point 941 can be similar (at a larger distance from surface 920) to the electric field coupling originating from point 942 (at a smaller distance from the surface).

FIGS. 10-12 below discuss examples of ring electrodes characterized by a more uniform capacitive coupling (e.g., resulting from an electric field which is stronger at points distal to the stylus tip). In some of the examples shown in FIGS. 10-12, ring electrode can correspond, for example, to ring electrode 503 shown in the example of FIG. 5A. For clarity, additional elements which can be present in a stylus (e.g., tip electrode, shaft, etc.) are omitted in FIGS. 10-12. In each of the examples shown, the ring electrode can be any suitable conductive material, such as metal, conductive paint, conductive ink, and the like. In some configurations, the ring electrode can be cylindrical in shape and partially or fully encompass a ring electrode base, wherein the ring electrode base is formed, at least in part, of a non-conductive material. In the examples shown here, the electrode base is cylindrical in shape, though the scope of this disclosure is not so limited. The configuration of the electrode base, including the routing of the electrical components in the ring electrode configuration, will be discussed in more detail below with reference to FIGS. 13A-13B.

Figure 10A:
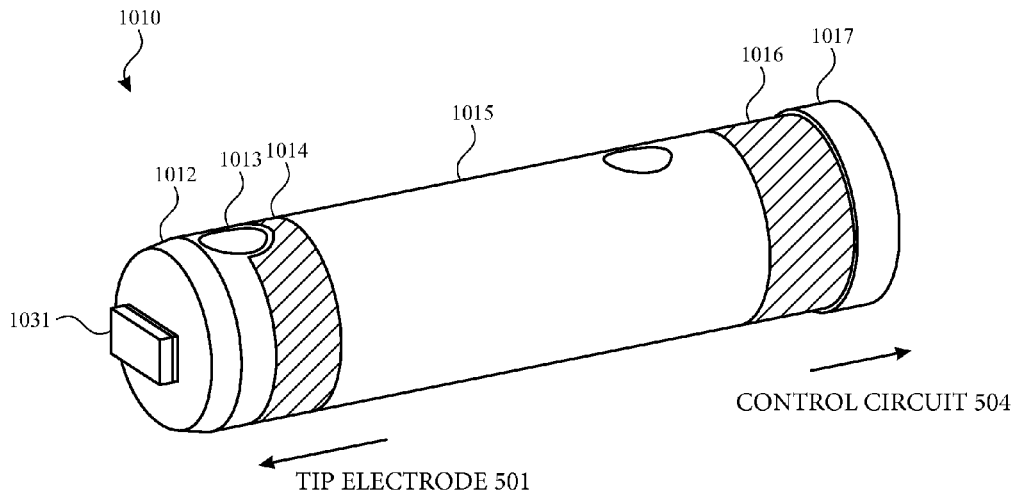
FIGS. 10A and 10B illustrate a perspective view and side view, respectively, of a ring electrode configuration configured to have a more uniform electric field coupling according to examples of the disclosure.
Figure 10B:
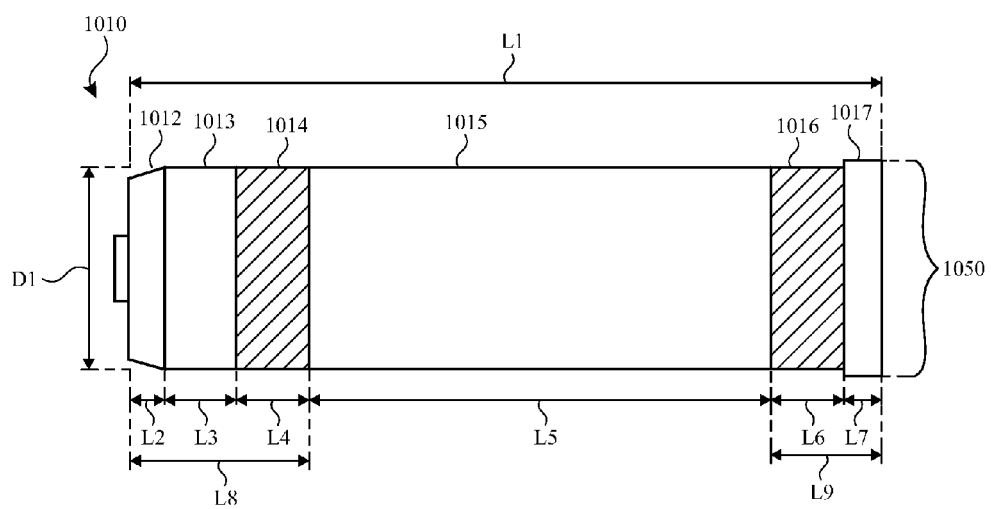

FIGS. 10A-10B illustrate an exemplary ring electrode configuration 1010 according to examples of the disclosure. FIG. 10A illustrates a perspective view of an exemplary ring electrode configuration including a single cylindrical ring electrode 1015. In the example shown, ring electrode base 1050 (e.g., the non-conductive support for conductive elements) can be cylindrical in shape and can be formed of any suitable non-conductive material. Ring electrode configuration 1010 can include a ground ring 1013 formed of any suitable conductive material. In some examples, the ring electrode configuration can include a proximate end piece 1012 proximate to the stylus tip. The proximate end piece 1012 can include a connector 1031 which can connect to the stylus tip electrode (not shown). In some configurations, a distal end piece can be formed of a conductive material, and in some cases, the distal end piece can be electrically grounded and operate as a ground plate 1017.

FIG. 10B illustrates a side view of the ring electrode configuration 1010. As shown, ring electrode configuration 1010 can have a total length L1. The proximate end piece 1012 can have a length L2. Ground ring 1013 can have a length L3. Ring electrode 1015 can be separated on one side from ground ring 1013 by a portion of non-conductive material portion 1014 (shown in shaded area) having a distance L4, and can be separated on an opposite side by another portion of non-conductive material 1016 (shown in shaded area) having a distance L6. Ring electrode 1015 can have a length of L5 and a diameter of D1. Ground plate 1017 can have a length L7. Ring electrode 1015 can be separated from the distal end of the ring electrode configuration 1010 by a length L9 (i.e., the combined length of L6 and L7) and separated from proximate end of the ring electrode configuration 1010 by a length L8 (i.e., the combined length of L2, L3, and L4). As set forth above with reference to FIG. 5A, ring electrode 1015 can electrically couple to control circuitry 504 or other stylus circuitry for transmitting and receiving signals. In configurations like that shown in FIGS. 10A-10B, the shape of the electric field emanating from ring electrode 1015 can be influenced by ground ring 1013 and ground plate 1017. Specifically, some of the electric field emanating from the ring electrode 1015 near the ground ring can be coupled to ground ring 1013. Similarly, some of the electric field emanating from ring electrode 1015 near the ground plate 1017 can be coupled to ground plate 1017. Consequently, the shape of the electric field emanating from ring electrode 1015 can be tuned by varying the lengths L1, L3, L4, L5 and L6.

In some examples, as the length L3 of ground ring 1013 increases or as the separation L4 between ground ring 1013 and ring electrode 1015 decreases, the electric field strength emanating from the end of ring electrode 1015 proximate to the stylus tip is reduced. Similarly, the electric field strength emanating from the end of ring electrode distal to the stylus tip can be reduced as the length L7 of ground plate 1017 is increased or as the separation L6 between ring electrode 1015 and ground plate 1017 is decreased. In some examples, the variables L1, L3, L4, L5 and L6 can be selected such that the electric field emanating from the end of ring electrode 1015 proximate to a stylus tip is weaker than the electric field emanating from the end of ring electrode 1015 distal to the stylus tip. Consequently, when a stylus having ring electrode configuration 1010 is held at an angle above a touch sensitive surface, the electric field coupling to the surface can be more uniform, as discussed above with reference to FIG. 9C. This can result in improved tilt accuracy and decreased tilt jitter. In some example configurations like that shown in FIG. 10B, to achieve a desired electric field shape, the length L5 of the ring electrode 1015 can be in a range of 3 mm and 7 mm. In some examples, the length L4 separating ground ring 1013 from ring electrode 1015 can be in a range of 3.5 mm and 6 mm. In some examples, the distance L6 between ring electrode 1015 and ground plate 1017 can be in a range of 2 mm and 4 mm. In some examples, the diameter D1 of ring electrode 1015 can be in a range of 1 mm and 3 mm. More generally, in some examples, the length L5 can be less than L4, and the length L6 can be less than the length L5.

Figure 11A:
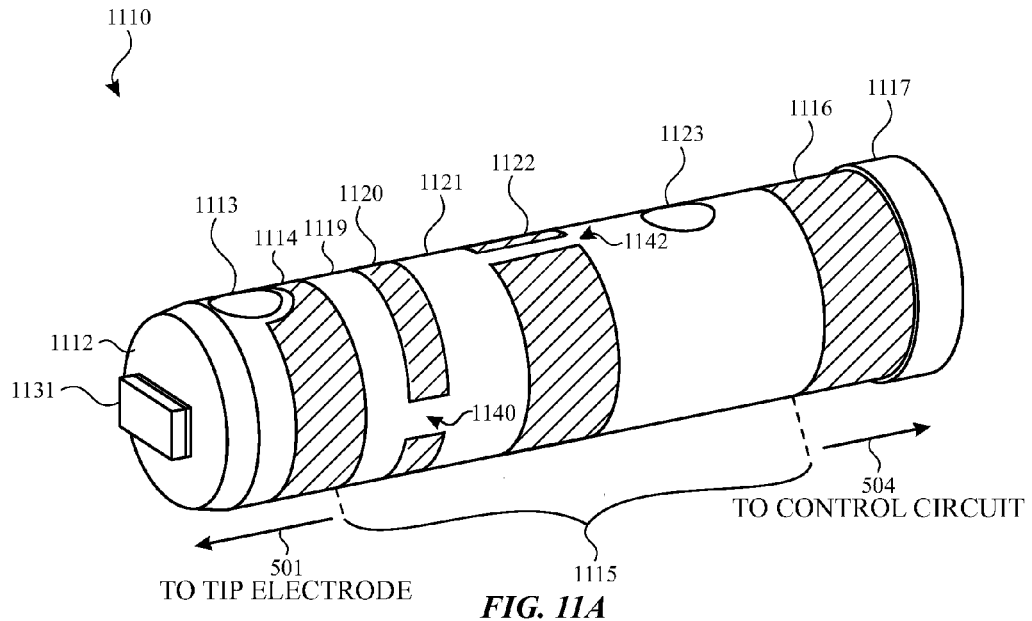
FIGS. 11A and 11B illustrate a perspective view and side view, respectively, of another ring electrode configuration configured to have a more uniform electric field coupling according to examples of the disclosure.
Figure 11B:
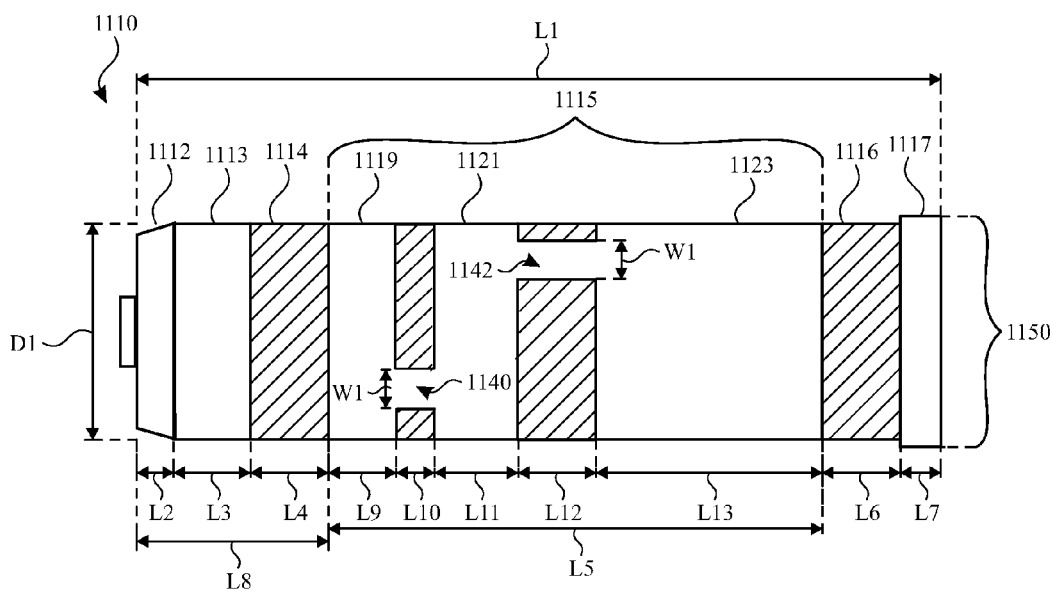

FIGS. 11A-11B illustrate another exemplary ring electrode configuration 1110 according to examples of the disclosure. FIG. 11A illustrates a perspective view of an exemplary ring electrode configuration in which ring electrode 1115 comprises a plurality of electrically connected sub-rings 1119, 1121, 1123, each having a cylindrical shape. As in the previous example of FIGS. 10A-10B, ring electrode configuration 1110 can also include a ground ring 1113 formed of any suitable conductive material. In this example, the ring electrode configuration can include a proximate end piece 1112 and ground plate 1117, which can be similar to the proximate end piece 1012 and ground plate 1017 described with reference to FIGS. 10A-10B above. In some examples, adjacent sub-rings 1119, 1121, 1123 can be electrically connected via connecting traces 1140, 1142 of conductive material (e.g., the same material forming ring electrode 1115) formed outside of the electrode base 1150. In the example shown here, connecting traces 1140, 1142 can be formed at different positions along the circumference of electrode base 1150. For example, a first trace 1140 connecting sub-rings 1119 and 1121 can be formed at a different angle orthogonal to the radial axis of the ring electrode than second trace 1142. In other examples, the second trace 1142 can be formed at the same angle. In some configurations not shown, more than one connecting trace can connect two adjacent sub-rings. In other examples not shown, the sub-rings may be electrically connected to one another using wiring routed, for example, through the electrode base 1150.

FIG. 11B illustrates a side view of the ring electrode configuration 1110. As shown, ring electrode configuration 1110 can have a total length L1. The proximate end piece 1112 can have a length L2. Ground ring 1113 can have a length L3. Ring electrode 1115 can be separated on one side from ground ring 1113 by a portion of non-conductive material 1114 (shown shaded) having a distance L4, and can be separated on an opposite side by another portion of non-conductive material 1116 (shown shaded) having a distance L6. Ring electrode 1115 can have a length of L5 and a diameter of D1. Ground plate 1117 can have a length L7. Ring electrode 1115 can be separated from the distal end of the ring electrode configuration 1110 by a length L9 (i.e., the combined length of L6 and L7) and separated from proximate end of the ring electrode configuration 1110 by a length L8 (i.e., the combined length of L2, L3, and L4). Ring electrode 1115 can be comprised of three sub-rings 1119, 1121, 1123. A first sub-ring 1119 can have a length L9 and can be separated from a second sub-ring 1121 by a portion of non-conductive material 1120 having a length L10. The second sub-ring 1121 can have a length L11 and can be separated from a third sub-ring 1123 by another portion of non-conductive material 1122 having a length L12. The third sub-ring 1123 can have a length of L13. Each of the connecting traces 1140, 1142 can have the same width W1, though in other cases the width may vary between connecting traces.

Like the example explained with reference to FIGS. 10A-10B above, the shape of the electric field emanating from ring electrode 1115 can be influenced by ground ring 1113 and ground plate 1117. Specifically, some of the electric field emanating from the ring electrode 1115 near the ground ring can be coupled to ground ring 1113. Similarly, some of the electric field emanating from ring electrode 1115 near the ground plate 1117 can be coupled to ground plate 1117. Also like the example of FIGS. 10A-10B, the shape of the electric field emanating from ring electrode 1115 can be tuned, at least in part, by varying the lengths L1, L3, L4, L5 and L6. In addition, the shape of the electric field emanating from ring electrode 1115 can be tuned, in part, by the lengths L9, L11, and L13 of sub-rings 1119, 1121, and 1123, respectively, and the lengths L10 and L12 separating the sub-rings. It should be noted that although this example discloses a ring electrode comprising three sub-rings, ring electrodes can include any multitude of sub-rings in order to achieve a desired tilt accuracy and tilt jitter performance. Further, one skilled in the art would recognize that the lengths and separation lengths of the additional sub-rings can be likewise tuned to achieve a desired result.

As in the example discussed with reference to FIGS. 10A-10B above, as the length L3 of ground ring 1113 increases or as the separation L4 between ground ring 1113 and ring electrode 1115 decreases, the electric field strength emanating from the end of ring electrode 1115 proximate to the stylus tip is reduced. Similarly, the electric field strength emanating from the end of ring electrode distal to the stylus tip can be reduced as the length L7 of ground plate 1117 is increased or as the separation L6 between ring electrode 1115 and ground plate 1117 is decreased. In addition, dimensions can be selected such that when the sub-ring lengths on the end proximate to the stylus tip (e.g., L9, L11) are larger than the sub-ring lengths on the end distal to the stylus tip (e.g., L13), the electric field strength can further be shaped to be stronger on the end distal to the stylus tip.

In some examples, the electric field shape of ring electrode 1115 can be approximated based on the surface area of portions of the ring electrode. Specifically, ring electrode 1115 can be conceptually divided in a cross-sectional plane orthogonal to the radial axis at a length L5/2 to form two conceptual portions. When the surface area of ring electrode 1115 (i.e., the total surface area of the conductive material forming the ring electrode) at the first portion proximate to stylus tip is less than the surface area of ring electrode 1115 at the second portion distal to the stylus tip, the electric field corresponding to the first portion can be weaker than the electric field corresponding to the second portion. That is, the electric field can be weaker proximate to the stylus tip and stronger distal to the stylus tip. Accordingly, in some examples, the total surface area of a first half of ring electrode 1115 that is proximate to the stylus tip can be less than the total surface than a second half of ring electrode that is distal to the stylus tip. One skilled in the art would understand that the conceptual division of ring electrode 1115 need not be an equal division (e.g., a division at L5/2). Moreover, ring electrode 1115 can be conceptually divided into greater portions (e.g., three portions each of a length L5/3), and the surface area of each portion can be progressively greater along the length of the ring electrode in a direction away from the stylus tip.

Some example dimensions for the ring electrode configuration 1110 shown in FIGS. 11A-11B will now be discussed. In some examples, sub-rings 1119, 1121, 1123 can increase in length along the length of ring electrode 1115. For example, length L11 of sub-ring 1121 can be greater than length L9 of sub-ring 1119, and length L13 of sub-ring 1123 can be greater than length L11 of sub-ring 1121. In some configurations, the length of a non-conductive separation adjacent to a sub-ring and distal from the stylus tip can be the same as the length of the sub-ring. For example, the length L10 of non-conductive separation 1120 adjacent to sub-ring 1119 and distal to the stylus tip can be the same as the length L9 of sub-ring 1119. Similarly, the length L12 of non-conductive separation 1122 adjacent to sub-ring 1121 and distal to the stylus tip can be the same as the length L11 of sub-ring 1121. In some configurations, each progressive sub-ring along the length of a ring electrode can increase in length by a scaling factor. For example, if a ring electrode includes N sub-rings, the length of the sub-rings can be defined as shown in Equation (1) below:

$$L_{SN} = L_B(s^{N-1}) \qquad (1)$$

where $L_{SN}$ is the length of an $N^{th}$ sub-ring $S_N$, $L_B$ is the baseline length (i.e., the length of the smallest subring), and s is the scaling factor. In some examples, the scaling factor s can be 2. In this case, to find the length of a third sub-ring (i.e., where N=3), Equation (1) can reduce as shown in Equation (2) below:

$$L_{S3} = L_B(2^{3-1}) = 4L_B \qquad (2)$$

where $L_B$ is the baseline length (i.e., the length of the smallest sub-ring). In some examples, ring electrode 1115 can have a baseline length in a range of 0.25 mm to 1 mm, the number of sub-rings can be 3, and the scaling factor s can be in a range of 1.5 and 2.5.

It should be noted that, as in the examples discussed above with reference to FIGS. 10A-10B, ground ring 1113 and ground plate 1117 can influence the shape of the electric field emanated from ring electrode 1115. As such, sub-rings 1119, 1121, 1123 need not necessarily be of increasing length in order to achieve a desired shape of the electric field. Similarly, in some examples, the lengths of sub-rings 1119, 1121, 1123 need not follow the formula set forth in Equation (1) in order to yield desired results. In some cases, the dimensions of ground ring 1113, ground plate 1117, and the separations between these elements and ring electrode 1115 can be similar to those discussed above with reference to FIGS. 10A-10B. Specifically, in some example configurations like that shown in FIG. 11B, to achieve a desired electric field shape, the length L5 of the ring electrode 1115 can be in a range of 3 mm and 7 mm. In some examples, the length L4 separating ground ring 1113 from ring electrode 1115 can be in a range of 3.5 mm and 6 mm. In some examples, the distance L6 between ring electrode 1115 and ground plate 1117 can be in a range of 2 mm and 4 mm. In some examples, the diameter D1 of ring electrode 1115 can be in a range of 1 mm and 3 mm. Moreover, in some examples, sub-ring 1119 length L9 can be in a range of 0.25 mm and 1 mm. The non-conductive separation 1120 length L10 between sub-ring 1119 and sub-ring 1121 can be in a range of 0.25 mm and 1 mm. Sub-ring 1121 length L11 can be in a range of 0.5 mm and 2 mm. The non-conductive separation 1122 length L12 between sub-ring 1121 and sub-ring 1123 can be in a range of 0.5 mm and 2 mm. Sub-ring 1123 length L13 can be in a range of 1 mm and 3 mm.

Figure 12A:
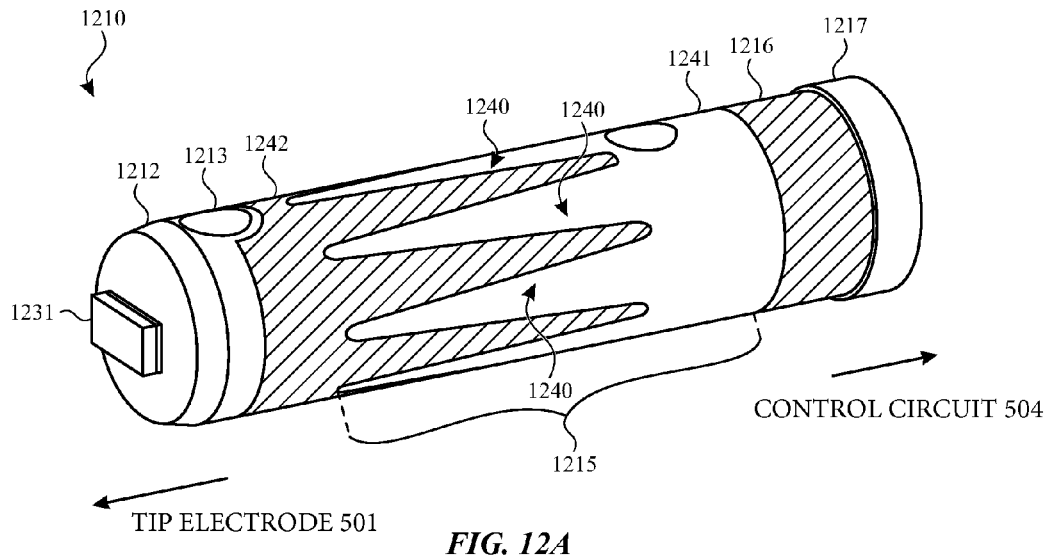
FIGS. 12A and 12B illustrate a perspective view and side view, respectively, of another ring electrode configuration configured to have a more uniform electric field coupling according to examples of the disclosure.

FIGS. 12A-12D illustrate another exemplary ring electrode configuration 1210 according to examples of the disclosure. FIG. 12A illustrates a perspective view of an exemplary ring electrode configuration in which ring electrode 1215 can comprise a cylindrical crown-shaped electrode having a plurality of projections 1240 that decrease in width along the length of the ring electrode toward the stylus tip. As in the previous example of FIGS. 10A-10B, ring electrode configuration 1210 can also include a ground ring 1213 formed of any suitable conductive material. In this example, the ring electrode configuration can include a proximate end piece and ground plate 1217, which can be similar to the proximate end piece 1212 and ground plate 1217 described with reference to FIGS. 10A-10B above.

Figure 12B:
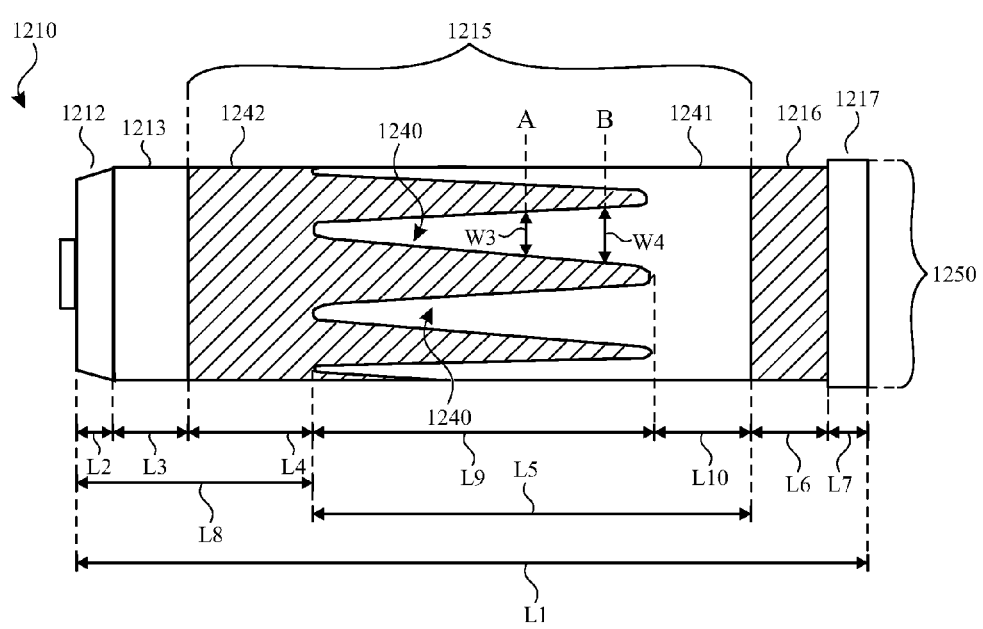

FIG. 12B illustrates a side view of the ring electrode configuration 1210. As shown, ring electrode configuration 1210 can have a total length L1. The proximate end piece 1212 can have a length L2. Ground ring 1213 can have a length L3. Ring electrode 1215 can be separated on one side from ground ring 1213 by a portion of non-conductive material 1242 (shown shaded) having a distance L4, and can be separated on an opposite side by another portion of non-conductive material 1216 (shown shaded) having a distance L6. Ring electrode 1215 can have a length of L5 and a diameter of D1. Ground plate 1217 can have a length L7. Ring electrode 1215 can be separated from the distal end of the ring electrode configuration 1210 by a length L9 (i.e., the combined length of L6 and L7) and separated from proximate end of the ring electrode configuration 1210 by a length L8 (i.e., the combined length of L2, L3, and L4).

Ring electrode 1215 can comprise a cylindrical crown shape wherein projections 1240 each can have a uniform length L9 and a width that tapers to a minimum width along the length of the ring electrode. Each of the projections 1240 can originate from a solid cylindrical portion 1241 having a length L10 and extend along the length of the ring electrode. In some examples, each of the projections 1240 can have a width that tapers (i.e., decreases linearly) to a minimum width along the length of the ring electrode 1215 in the direction of the stylus tip (e.g., the direction of connector 1231). For example, at a reference line B shown in FIG. 12B, a projection can have a width W2, while at a reference line A, nearer to the stylus tip than reference line B, the projection can have a width W1, smaller than W2.

As similarly explained with reference to FIGS. 10A-10B above, the shape of the electric field emanating from ring electrode 1215 can be influenced by ground ring 1213 and ground plate 1217. Specifically, some of the electric field emanating from the ring electrode 1215 near the ground ring can be coupled to ground ring 1213. Similarly, some of the electric field emanating from ring electrode 1215 near the ground plate 1217 can be coupled to ground plate 1217. Also as in the example of FIGS. 10A-10B, the shape of the electric field emanating from ring electrode 1215 can be tuned, at least in part, by varying the lengths L1, L3, L4, L5 and L6. In addition, the shape of the electric field emanating from ring electrode 1215 can be tuned, in part, by the length L10 of solid cylindrical portion 1241, the number of projections 1240 extending from the solid cylindrical portion, and the shape of the projections, including the projection lengths L9. For example, where the length of solid cylindrical portion 1241 is larger, the electric field can be stronger at the end of the ring electrode 1215 distal to the stylus tip. In addition, as the width of projections 1240 tapers to a minimum width, the electric field emanating from the ring electrode 1215 at these points can also decrease. Thus, these variables can be tuned in order to achieve a desired electric field coupling (i.e., capacitive coupling) between the ring electrode and a touch-sensitive surface, which can lead to better tilt accuracy and less tilt jitter.

Figure 12C:
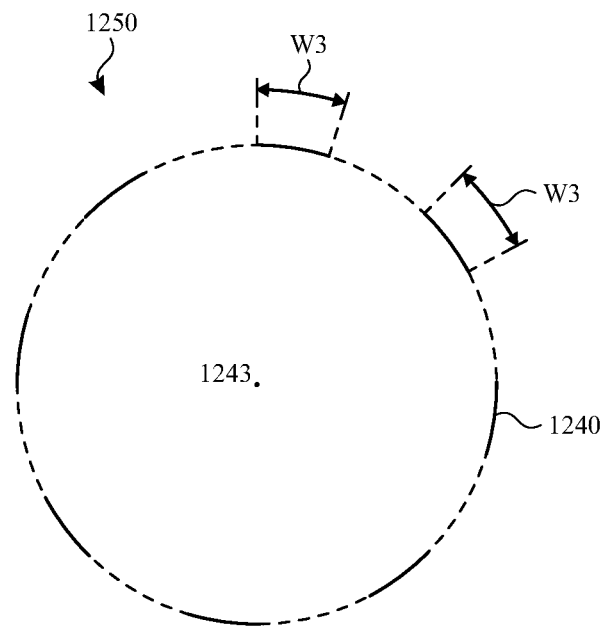
FIGS. 12C and 12D illustrate cross-sectional views of the ring electrode of FIGS. 12A-12B at two reference lines along the length of the ring electrode according to examples of the disclosure.
Figure 12D:
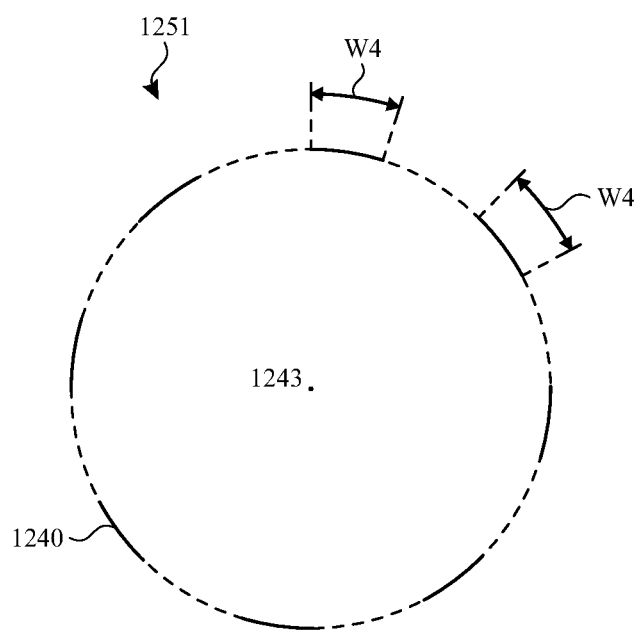

FIGS. 12C-12D illustrate a cross-sectional view of ring electrode 1215 at two positions along the length of the ring electrode corresponding to reference lines A and B respectively in FIG. 12B. As shown, projections 1240 can be equidistantly spaced around the circumference of the ring electrode base 1250 (not shown) about a center point 1243 and can conform to the cylindrical shape of the ring electrode base. In the example shown here, ring electrode 1215 can include eight projections 1240. As indicated in both FIGS. 12B and 12C, at the reference line A nearer to the stylus tip, the projections can each have a width W3. As shown in both FIGS. 12B and 12D, at the reference line B distal to the stylus tip, the projections can each have a width W4, greater than W3. In general, the width of a projection in the configuration shown in FIGS. 12A-12D can be defined according to Equation (3) below:

$$W_d = \frac{(L5 - d)(c)}{(N)(L_9)} \qquad (3)$$

where d represents a distance from the ring electrode end distal to the stylus tip, L5 represents the length of the ring electrode as shown in FIG. 12B, $W_d$ represents the width of a projection at a distance d, c represents the circumference of the circle formed by a cross-section of the cylinder at the distance d, N represents the number of projections in the ring electrode, and L9 represents the length of the projections as indicated in FIG. 12B. In some configurations, the strength of the electric field emanating from an area of ring electrode 1215 can correspond to the width of the projections 1240 at that area.

As similarly discussed with reference to FIGS. 11A-11B above, the electric field shape of ring electrode 1215 can be approximated based on the surface area of portions of the ring electrode. Here, if ring electrode 1215 is conceptually divided in a cross-sectional plane perpendicular to the radial axis of the ring electrode at a length L5/2 to form two conceptual portions, the surface area of ring electrode 1215 at the first portion proximate to stylus tip (e.g., the portion having the more tapered end of projections 1240) is less than the surface area of ring electrode 1215 at the second portion distal to the stylus tip (e.g., the portion having the solid cylindrical portion 1241 and the wider ends of the projections). Therefore, the electric field can be weaker proximate to the stylus tip and stronger distal to the stylus tip. One skilled in the art would understand that the conceptual division of ring electrode 1215 need not be an equal division (e.g., a division at L5/2). Moreover, ring electrode 1215 can be conceptually divided into greater portions (e.g., three portions each of a length L5/3), and the surface area of each portion can be progressively greater along the length of the ring electrode in a direction away from the stylus tip.

Some example dimensions for the ring electrode configuration 1210 shown in FIGS. 12A-12D will now be discussed. As in previous examples, the length L5 of the ring electrode can be in a range of 3 mm to 7 mm. In some examples, the length L9 of projections 1240 can be greater than the length L10 of the solid cylindrical portion 1241. In some examples, a ratio of the length L9 of projections 1240 to the length L10 of solid cylindrical portion 1241 can be in a range of 2:1 and 3:1. In some examples like those shown in FIGS. 12A-12D, the length L9 of projections 1240 can be in a range of 2.5 mm and 4.5 mm, and the length L10 of the solid cylindrical portion 1241 can be in a range of 0.5 mm and 2.5 mm.

It should be noted that, as in the examples discussed above with reference to FIGS. 10A-10B, ground ring 1213 and ground plate 1217 can influence the shape of the electric field emanated from ring electrode 1215. In some cases, the dimensions of ground ring 1213, ground plate 1217, and the separations between these elements and ring electrode 1215 can be similar to those discussed above with reference to FIGS. 10A-10B. Specifically, in some example configurations like that shown in FIGS. 12A-12D, to achieve a desired electric field shape, the length L5 of the ring electrode 1215 can be in a range of 3 mm and 7 mm. In some examples, the length L4 separating ground ring 1213 from ring electrode 1215 can be in a range of 3.5 mm and 6 mm. In some examples, the distance L6 between ring electrode 1215 and ground plate 1217 can be in a range of 2 mm and 4 mm. In some examples, the diameter D1 of ring electrode 1215 can be in a range of 1 mm and 3 mm. It should be understood that the ring electrodes including projections illustrated in FIGS. 12A-12D are exemplary only. The scope of this disclosure contemplates additional configurations in which the projections are of a different shape, including projections having a width that tapers non-linearly.

Although the example configurations discussed herein with reference to FIGS. 10-12 have been discussed as separate configurations, in some examples, different configurations may be combined such that the ring electrode electric field coupling with the touch sensitive surface results in improved stylus performance (e.g., increased tilt accuracy and decreased tilt jitter). For example, the sub-rings of the configurations discussed with reference to FIGS. 11A-11B can be combined with the tapered projections discussed with reference to FIGS. 12A-12D.

Figure 13A:
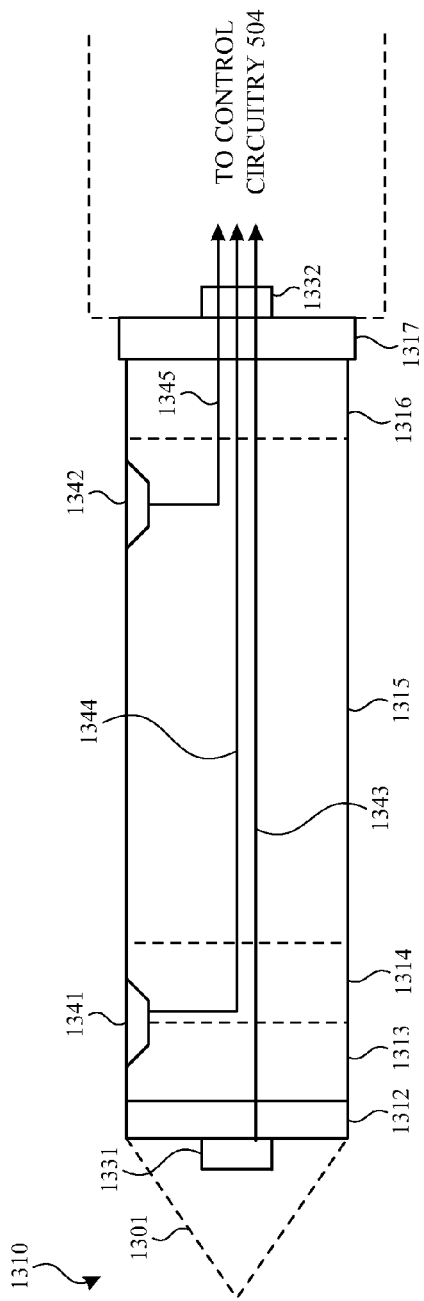
FIGS. 13A and 13B illustrate a cross-sectional view and side view, respectively, of a ring electrode base including routing wires according to examples of the disclosure.

FIG. 13A illustrates an exemplary cross-sectional view of a ring electrode base 1350 including a simplified circuit diagram of routing wires 1343-1345 according to examples of the disclosure. The ring electrode base 1350 can correspond, for example, to the ring electrode base 1050 discussed with reference to FIGS. 10A-10B above. For reference, the locations of tip electrode 1301, ground ring 1313, ring electrode 1315, and non-conductive portions 1314 and 1316 are illustrated in dashed lines. In some examples, ring electrode base 1350 can include a first connector 1331 configured to electrically couple to a tip electrode 1301 (illustrated in dashed line) as discussed above with reference to FIGS. 5A-5B. Signals from tip electrode 1301 can be routed through the ring electrode base via one or more tip electrode routing wires 1343. Additionally, ring electrode base 1350 can include a second connector 1332 distal to the stylus tip and configured to electrically couple to control circuitry 504 (not shown) as discussed above with reference to FIG. 5A. In some examples, ground ring 1313 can include a ground via 1341 coupled to one or more ground routing wires 1344. Similarly, ring electrode 1315 can include an electrode via 1342 coupled to one or more ring electrode routing wires 1345. Though not shown here, ring electrode base 1350 can include additional vias, for example, vias corresponding to ground via 1341 and electrode via 1342 on a side opposite vias 1341 and 1342. Tip electrode routing wires 1343, ground routing wires 1344, and ring electrode routing wires 1345 can be routed through the ring electrode base 1350 to the second connector 1332. From the second connector, the signals on the routing wires can be routed to the control circuitry 504.

Figure 13B:
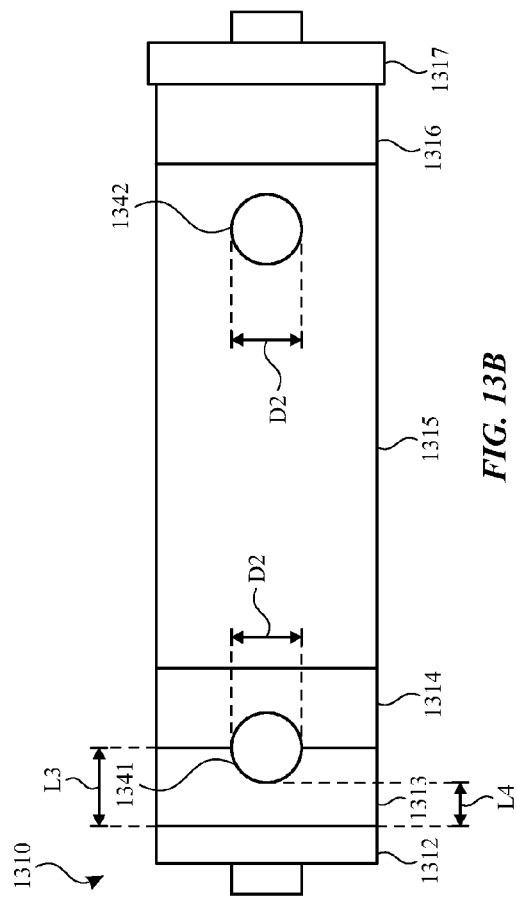

FIG. 13B illustrates a top view of the ring electrode base 1350. In some configurations ground via 1341 and electrode via 1342 can be necessary to couple the ground ring 1313 and ring electrode 1315 to routing wires 1344 and 1345, respectively. Due to manufacturing constraints, vias 1341 and 1342 may need to be of a minimum diameter D2 in order to be properly coupled to routing wires. Additionally, vias 1341 and 1342 may need to be separated from adjacent components by at least length L14 to satisfy manufacturing constraints. As discussed with reference to at least FIGS. 10A-10B above, length L3 of ground ring 1313 can be tuned in order to achieve a desired electric field coupling (i.e., capacitive coupling) between ring electrode 1315 and a touch sensitive surface. In some examples, the length L3 of ground ring 1313 may be less than the combined length of the minimum separation length L14 and via diameter D2. Accordingly, as shown in FIG. 13B, a portion of ground via 1341 can extend outside of ground ring 1313 in the area of the non-conductive separation 1314. In some examples, half of ground via 1341 associated with ground ring 1313 can be positioned on the ground ring 1313 and half of the via can protrude into the non-conductive separation area 1314.

It should be noted that although often described in the context of a stylus, the examples herein can be applied to other input devices interacting with touch-sensitive surfaces. Additionally, although often described with regard to a touch screen, the input devices can be used with touch-sensitive devices that do not include a touch screen. Finally, it should be noted that elements of the examples described herein can be combined in different ways, including adding or omitting various elements illustrated or described herein.

Some examples of the disclosure are directed to an apparatus comprising: a base formed of a non-conductive material; a ring electrode formed of a conductive material and encircling the base; a ground ring formed of the conductive material and encircling the base and separated from the ring electrode by a first distance; and a ground plate formed of a second conductive material and separated from the ring electrode by a second distance; wherein the ring electrode is connected to a drive circuitry, the ground ring is connected to a reference potential, and the ground plate is connected to the reference potential. Additionally or alternatively to one or more of the examples disclosed above, in some examples, at least a portion of the ring electrode is a hollow cylindrical shape having a first outer diameter, and wherein at least a portion of the ground electrode is a hollow cylindrical shape having the first outer diameter. Additionally or alternatively to one or more of the examples disclosed above, in some examples, the ring electrode has a length greater than the first outer diameter of the ring electrode. Additionally or alternatively to one or more of the examples disclosed above, in some examples, the ring electrode has a first length and the ground ring has a second length less than the first length; Additionally or alternatively to one or more of the examples disclosed above, in some examples, the first distance between the ring electrode and ground ring is smaller than the first length of the ground ring. Additionally or alternatively to one or more of the examples disclosed above, in some examples, the first length is in a range of 3 mm and 7 mm. Additionally or alternatively to one or more of the examples disclosed above, in some examples, the first distance is in a range of 3.5 mm and 6 mm. Additionally or alternatively to one or more of the examples disclosed above, in some examples, the second distance is in a range of 2 mm and 4 mm. Additionally or alternatively to one or more of the examples disclosed above, in some examples, the apparatus further comprises a first connector configured to couple the apparatus to a tip electrode of a stylus device. Additionally or alternatively to one or more of the examples disclosed above, in some examples, the ring electrode is configured to capacitively couple to a touch-sensitive surface, and the ring electrode is also configured to capacitively couple to the ground ring. Additionally or alternatively to one or more of the examples disclosed above, in some examples, the apparatus further comprises one or more first conductive traces coupled to the ring electrode, one or more second conductive traces coupled to the ground ring, wherein the first and second conductive traces are routed through the base. Additionally or alternatively to one or more of the examples disclosed above, in some examples, the apparatus further comprises one or more first vias configured to couple the first conductive traces to the ring electrode and one or more second vias configured to couple the second conductive traces to the ground ring. Additionally or alternatively to one or more of the examples disclosed above, in some examples, at least one of the one or more second vias has a circular shape with a second diameter which is larger than a length of the ground ring. Additionally or alternatively to one or more of the examples disclosed above, in some examples, the reference potential is a ground voltage.

Some examples of the disclosure are directed to an electrode for an active stylus, comprising: a plurality of hollow cylindrical sub-rings positioned parallel to one another along a length of the electrode; wherein each of the sub-rings is separated from adjacent sub-rings in a first direction by a respective separation distance; and wherein a respective length of each sub-ring increases with each of the hollow cylindrical sub-ring along the length of the electrode in the first direction. Additionally or alternatively to one or more of the examples disclosed above, in some examples, the respective length of each sub-ring along the length of the electrode increases by a scaling factor. Additionally or alternatively to one or more of the examples disclosed above, in some examples, the scaling factor is in a range of 1.5 and 2.5. Additionally or alternatively to one or more of the examples disclosed above, in some examples, a separation distance between a first sub-ring and a second sub-ring adjacent in a first direction is equal to a length of the first sub-ring. Additionally or alternatively to one or more of the examples disclosed above, in some examples, each of the sub-rings are electrically connected via one or more conductive traces.

Additionally or alternatively to one or more of the examples disclosed above, in some examples, each of the conductive traces in the electrode are formed on a same cylindrical contour and are situated at different angles with respect to a radial axis of the cylindrical contour. Additionally or alternatively to one or more of the examples disclosed above, in some examples, if the electrode is conceptually divided into a first and second half of equal axial length by a plane orthogonal to a radial axis of the electrode, the first half has a surface area greater than a surface area of the second half.

Some examples of the disclosure are directed to an electrode for an active stylus, comprising: a hollow cylindrical ring portion; a plurality of projections forming a crown shape; wherein each of the plurality of projections originates at the hollow cylindrical ring portion and extends from the hollow cylindrical ring portion along a length of the electrode toward a first end, and wherein each of the plurality of projections has a maximum width at the hollow cylindrical ring portion which tapers to a minimum width at the first end of the electrode. Additionally or alternatively to one or more of the examples disclosed above, in some examples, each of the plurality of projections has a first length; and the hollow cylindrical ring portion has a second length less than the first length. Additionally or alternatively to one or more of the examples disclosed above, in some examples, a ratio of the first length to the second length is in a range of 2:1 and 3:1. Additionally or alternatively to one or more of the examples disclosed above, in some examples, the first length is in a range of 2.5 mm and 4.5 mm, and the second length is in a range of 0.5 mm and 2.5 mm.

Some examples of the disclosure are directed to an input device comprising: a body including a shaft portion and a tip portion; a tip electrode at the distal end of the input device and disposed in the tip portion; a ring electrode apparatus disposed in the tip portion distal to the tip electrode, wherein the ring electrode apparatus includes: a base formed of a non-conductive material; a ring electrode formed of a conductive material and encircling the base; a ground ring formed of the conductive material and encircling the base and separated from the ring electrode by a first distance; a ground plate formed of a second conductive material and separated from the ring electrode by a second distance; stimulation circuitry coupled to the ring electrode and configured to generate one or more stimulation signals.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. An apparatus comprising:
a base formed of a non-conductive material;
a ring electrode formed of a conductive material and encircling the base;
a ground ring formed of the conductive material and encircling the base and separated from the ring electrode by a first distance; and
a ground plate formed of a second conductive material and separated from the ring electrode by a second distance;
wherein the ring electrode is connected to a drive circuitry, the ground ring is connected to a reference potential, and the ground plate is connected to the reference potential.

2. The apparatus of claim 1, wherein at least a portion of the ring electrode is a hollow cylindrical shape having a first outer diameter, and wherein at least a portion of the ground electrode is a hollow cylindrical shape having the first outer diameter.

3. The apparatus of claim 2, wherein the ring electrode has a length greater than the first outer diameter of the ring electrode.

4. The apparatus of claim 1, wherein the ring electrode has a first length and the ground ring has a second length less than the first length.

5. The apparatus of claim 4, wherein the first distance between the ring electrode and ground ring is smaller than the first length of the ring electrode.

6. The apparatus of claim 4 wherein the first length is in a range of 3 mm and 7 mm.

7. The apparatus of claim 4 wherein the first distance is in a range of 3.5 mm and 6 mm.

8. The apparatus of claim 4 wherein the second distance is in a range of 2 mm and 4 mm.

9. The apparatus of claim 1 wherein the apparatus further comprises a first connector configured to couple the apparatus to a tip electrode of a stylus device.

10. The apparatus of claim 1 wherein the ring electrode is configured to capacitively couple to a touch-sensitive surface, and the ring electrode is also configured to capacitively couple to the ground ring.

11. The apparatus of claim 1 further comprising one or more first conductive traces coupled to the ring electrode, one or more second conductive traces coupled to the ground ring, wherein the first and second conductive traces are routed through the base.

12. The apparatus of claim 11 further comprising one or more first vias configured to couple the first conductive traces to the ring electrode and one or more second vias configured to couple the second conductive traces to the ground ring.

13. The apparatus of claim 12 wherein at least one of the one or more second vias has a circular shape with a second diameter which is larger than a length of the ground ring.

14. The apparatus of claim 1 wherein the reference potential is a ground voltage.

15. An electrode for an active stylus, comprising:
a plurality of hollow cylindrical sub-rings positioned parallel to one another along a length of the electrode;
wherein each of the sub-rings is separated from adjacent sub-rings in a first direction by a respective separation distance and wherein each of the sub-rings is electrically connected to one or more of the adjacent sub-rings via one or more conductive traces disposed between the adjacent sub-rings such that each of the sub-rings of the electrode are at a same electrical potential; and
wherein a respective length of each sub-ring increases with each of the hollow cylindrical sub-ring along the length of the electrode in the first direction.

16. The electrode of claim 15, wherein the respective length of each sub-ring along the length of the electrode increases by a scaling factor.

17. The electrode of claim 16, wherein the scaling factor is in a range of 1.5 and 2.5.

18. The electrode of claim 15, wherein a separation distance between a first sub-ring and a second sub-ring adjacent in a first direction is equal to a length of the first sub-ring.

19. The electrode of claim 15, wherein each of the conductive traces in the electrode are formed on a same cylindrical contour and are situated at different angles with respect to a radial axis of the cylindrical contour.

20. The electrode of claim 15, wherein
a surface area of a first half of the electrode is greater than a surface area of a second half of the electrode, wherein the first half of the electrode and second half of the electrode are of equal axial length and are defined by a plane orthogonal to a radial axis of the electrode.

21. An electrode for an active stylus, comprising:
a hollow cylindrical ring portion;
a plurality of projections forming a crown shape;
wherein each of the plurality of projections originates at the hollow cylindrical ring portion and extends from the hollow cylindrical ring portion along a length of the electrode toward a first end, and
wherein each of the plurality of projections has a maximum width at the hollow cylindrical ring portion which tapers to a minimum width at the first end of the electrode.

22. The electrode of claim 21, wherein
each of the plurality of projections has a first length; and
the hollow cylindrical ring portion has a second length less than the first length.

23. The electrode of claim 22, wherein
a ratio of the first length to the second length is in a range of 2:1 and 3:1.

24. The electrode of claim 22, wherein
the first length is in a range of 2.5 mm and 4.5 mm, and
the second length is in a range of 0.5 mm and 2.5 mm.

25. An input device comprising:
a body including a shaft portion and a tip portion;
a tip electrode at a distal end of the input device and disposed in the tip portion;
a ring electrode apparatus disposed in the tip portion distal to the tip electrode, wherein the ring electrode apparatus includes:
a base formed of a non-conductive material;
a ring electrode formed of a conductive material and encircling the base;

a ground ring formed of the conductive material and encircling the base and separated from the ring electrode by a first distance;
a ground plate formed of a second conductive material and separated from the ring electrode by a second distance;
stimulation circuitry coupled to the ring electrode and configured to generate one or more stimulation signals.

* * * * *